United States Patent
Lee et al.

(10) Patent No.: US 9,436,038 B2
(45) Date of Patent: Sep. 6, 2016

(54) LIQUID CRYSTAL DISPLAY

(75) Inventors: Moon Yeon Lee, Uiwang-si (KR); Kyu Yeol In, Uiwang-si (KR); Woo Jung Kim, Uiwang-si (KR); Jae Hyun Kim, Uiwang-si (KR); Kyoung Ah Oh, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 192 days.

(21) Appl. No.: 14/357,647

(22) PCT Filed: Aug. 28, 2012

(86) PCT No.: PCT/KR2012/006866
§ 371 (c)(1),
(2), (4) Date: Aug. 26, 2014

(87) PCT Pub. No.: WO2013/073764
PCT Pub. Date: May 23, 2013

(65) Prior Publication Data
US 2015/0062499 A1    Mar. 5, 2015

(30) Foreign Application Priority Data
Nov. 14, 2011  (KR) .................. 10-2011-0118551

(51) Int. Cl.
*C09K 19/00* (2006.01)
*G02F 1/13363* (2006.01)
(Continued)

(52) U.S. Cl.
CPC ....... *G02F 1/133634* (2013.01); *C08F 222/40* (2013.01); *G02F 1/133528* (2013.01);
(Continued)

(58) Field of Classification Search
CPC ........... Y10T 428/10; Y10T 428/1005; G02F 1/13363; G02F 1/133634; G02F 1/133528; G02F 2001/133631; G02F 2001/133637; C08F 212/08; C08F 212/10; C08F 212/14; C08F 212/145; C08F 222/40
USPC .................... 428/1.1, 1.3; 349/96, 117, 118; 359/489.02, 486.01
See application file for complete search history.

(56) References Cited

U.S. PATENT DOCUMENTS

2009/0207355 A1    8/2009  Yanai et al.
2010/0104776 A1*   4/2010  Kim et al. ................... 428/1.31
2013/0286330 A1*  10/2013  Lee et al. ........................ 349/96

FOREIGN PATENT DOCUMENTS

KR  10-2006-0128731 A  12/2006
KR  10-2008-0093219 A  10/2008
(Continued)

OTHER PUBLICATIONS

Office Action mailed Dec. 22, 2014 in corresponding Taiwanese Patent Application No. 101142288.
(Continued)

*Primary Examiner* — Ruiyun Zhang
(74) *Attorney, Agent, or Firm* — Lee & Morse, P.C.

(57) ABSTRACT

The liquid crystal display of the present invention includes: a liquid crystal panel including vertical alignment liquid crystals encapsulated between a first substrate and a second substrate; a first compensation layer stacked on one side of the first layer; a first polarizing layer stacked on one side of the first compensation layer; a second compensation layer stacked on one side of the second substrate; and a second polarizing layer stacked on one side of the second compensation layer, wherein the first compensation layer includes a polyimide copolymer, and the polyimide copolymer is a copolymer of a monomer mixture including maleimide compounds and aromatic vinyl compounds. The liquid crystal display provides significantly improved lateral viewing angle.

16 Claims, 2 Drawing Sheets

(51) Int. Cl.
  *C08F 222/40* (2006.01)
  *G02F 1/1335* (2006.01)
  *C08F 212/08* (2006.01)
(52) U.S. Cl.
  CPC .. *C08F212/08* (2013.01); *G02F 2001/133637* (2013.01); *Y10T 428/10* (2015.01); *Y10T 428/1036* (2015.01)

(56) References Cited

FOREIGN PATENT DOCUMENTS

| KR | 10-2009-0127679 | A | | 12/2009 |
| KR | 1020090127679 | A | * | 12/2009 |
| KR | 1020090127679 | A | * | 9/2010 |
| KR | 10-2010-0101981 | A | | 9/2014 |
| TW | 201111176 | A | | 4/2011 |
| TW | 201132722 | A | | 10/2011 |
| TW | 201235749 | A | | 9/2012 |
| WO | WO 2012091304 | A2 | * | 7/2012 |

OTHER PUBLICATIONS

Chinese Office Action mailed Dec. 8, 2015 in corresponding Chinese Patent Application No. 201280055962.6; Lee.

* cited by examiner

LIQUID CRYSTAL DISPLAY

TECHNICAL FIELD

The present invention relates to a liquid crystal display, and more particularly, to a vertical alignment liquid crystal display that includes a compensation layer capable of improving a viewing angle.

BACKGROUND ART

Currently, liquid crystal displays (LCD) are one of the most widely used flat panel displays. In general, a liquid crystal display has a liquid crystal layer encapsulated between a thin film transistor array substrate and a color filter substrate. When an electric field is applied to electrodes on the array substrate and the color filter substrate, liquid crystal molecules of the liquid crystal layer encapsulated between the substrates are rearranged, thereby displaying an image. The liquid crystal display includes a polarizing film (polarizing plate) outside the array substrate and the color filter substrate. The polarizing film can control polarization of light by allowing selective transmission of light traveling in a certain direction among light emitted from a backlight unit and having passed through the liquid crystal layer. The polarizing plate generally includes a polarizer capable of polarizing light in a certain direction, a protective layer, and a compensation film.

Liquid crystal displays have a fundamental problem of a viewing angle due to anisotropy of an index of refraction of liquid crystals. To improve the viewing angle of existing twisted nematic mode, wide viewing angle technologies such as vertical alignment mode, horizontal alignment mode (IPS, FFS) and the like have been employed.

Horizontal alignment mode liquid crystals have a disadvantage of slow response rate but provide a good contrast ratio and a good viewing angle at tilt angles. On the contrary, vertical alignment mode liquid crystals provide a rapid response rate and an excellent front contrast ratio. However, the vertical alignment mode liquid crystals exhibit low viewing angle characteristics due to severe fluctuation of a polarized state at tilt angles. Therefore, it is very important for liquid crystal displays employing the vertical alignment mode liquid crystals to improve the viewing angle characteristics, and a compensation film for improving the viewing angle is essential for the liquid crystal displays employing the vertical alignment mode liquid crystals.

In conventional liquid crystal displays employing the vertical alignment mode liquid crystals, the slow axis is managed by biaxial elongation. However, when the slow axis is managed by biaxial elongation, the slow axis must be set in a width direction, which necessitates separate elongation in a transverse direction, thereby making it difficult to manage the axis and increasing manufacturing costs.

DISCLOSURE

Technical Problem

An object of the present invention is to provide a liquid crystal display which can significantly improve viewing angle (contrast ratio).

Another object of the present invention is to provide a liquid crystal display including a uniaxially oriented compensation layer, which can facilitate axis management, and reduce costs.

Still another object of the present invention is to provide a vertical alignment liquid crystal display which provides a greatly improved lateral viewing angle (contrast ratio).

Technical Solution

One aspect of the present invention provides a liquid crystal display. The liquid crystal display includes: a liquid crystal panel including vertical alignment liquid crystals encapsulated between a first substrate and a second substrate; a first compensation layer stacked on one side of the first layer; a first polarizing layer stacked on one side of the first compensation layer; a second compensation layer stacked on one side of the second substrate; and a second polarizing layer stacked on one side of the second compensation layer, wherein the first compensation layer comprises polyimide copolymer. Here, the polyimide copolymer is a copolymer of a monomer mixture including maleimide compounds and aromatic vinyl compounds.

In one embodiment, the monomer mixture may further include maleic anhydride.

In one embodiment, the monomer mixture may further include maleic anhydride and a vinyl cyanide compound.

In one embodiment, the polyimide copolymer may include a unit represented by Formula 1-1, a unit represented by Formula 1-2, a unit represented by Formula 1-3, and a unit represented by Formula 1-4:

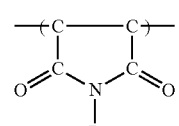

[Formula 1-1]

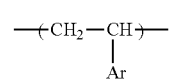

[Formula 1-2]

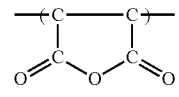

[Formula 1-3]

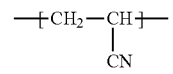

[Formula 1-4]

in the Formula 1-1, R is hydrogen, a substituted or unsubstituted $C_1$-$C_6$ alkyl group, or a substituted or unsubstituted $C_6$-$C_{12}$ aryl group; and in the Formula 1-2, Ar is each independently a substituted or unsubstituted $C_1$-$C_{12}$ aryl group.

In one embodiment, the polyimide copolymer may be represented by Formula 1:

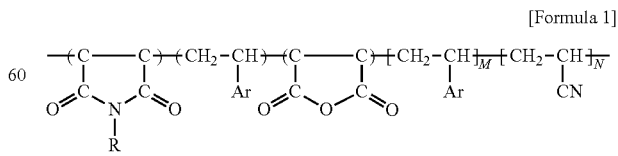

[Formula 1]

in the Formula 1, R is hydrogen, a substituted or unsubstituted $C_1$-$C_6$ alkyl group, or a substituted or unsubstituted $C_6$-$C_{12}$ aryl group; Ar is each independently a substituted or unsubstituted $C_1$-$C_{12}$ aryl group; and M and N are each independently an integer from 2 to 8.

In one embodiment, the first compensation layer may have reversed wavelength dispersion characteristics.

In one embodiment, the first compensation layer may have $C_s$ of about −0.7 to about −0.2, $R_e$ of about 40 nm to about 100 nm at about 550 nm, and $R_{th}$ of about 100 nm to about 150 nm at about 550 nm.

In one embodiment, the second compensation layer may be a biaxial film or a C-plate.

In one embodiment, the biaxial film may have indexes of refraction ($n_x$, $n_y$) in x and y directions on a plane and an index of refraction ($n_z$) in a thickness direction satisfying a relationship: $n_x$>$n_y$>$n_z$, $R_e$ of greater than 0 ($R_e$>0), and $R_{th}$ of less than 0 ($R_{th}$<0). The biaxial film may be a cycloolefin polymer (COP), triacetylcellulose (TAC), or polyether sulfone (PES) compensation film.

In one embodiment, the C-plate may be a COP or acrylic compensation film having indexes of refraction ($n_x$, $n_y$) in x and y directions on a plane and an index of refraction ($n_z$) in a thickness direction satisfying a relationship: $n_x$=$n_y$<$n_z$, and $R_{th}$ of greater than 0 ($R_{th}$>0).

In one embodiment, the first compensation layer may have a slow axis perpendicular to a slow axis of the second compensation layer. Here, the slow axis of the first compensation layer may be perpendicular to an absorption axis of the first polarizing layer, and the slow axis of the second compensation layer may be perpendicular to the absorption axis of the second polarizing layer.

Advantageous Effects

The present invention has the inventive effect providing a liquid crystal display including a uniaxially oriented compensation layer, which can significantly improve viewing angle (contrast ratio), facilitate axis management, and reduce costs, and more particularly, a vertical alignment liquid crystal display which provides a greatly improved lateral viewing angle (contrast ratio).

BEST MODE

Hereinafter, embodiments of the present invention will be described in detail with reference to the accompanying drawings.

Figure 1:
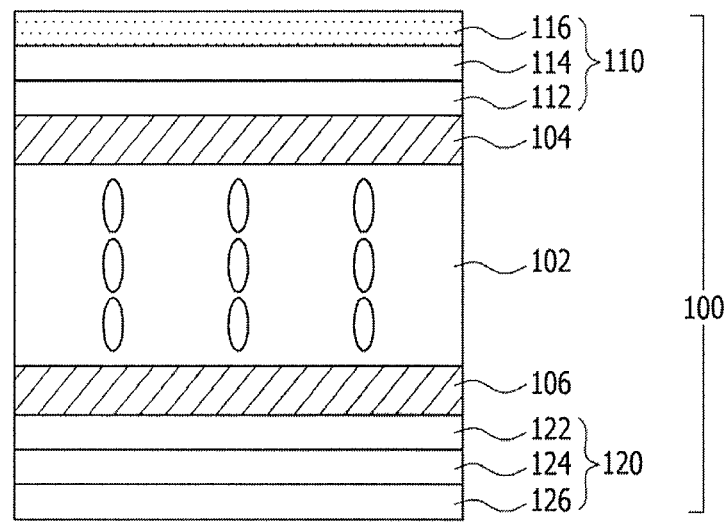
FIG. 1 is a cross sectional view of a liquid crystal display according to one embodiment of the present invention.

FIG. 1 is a cross sectional view of a liquid crystal display according to one embodiment of the present invention. In FIG. 1, the liquid crystal display 100 according to one embodiment of the present invention includes a liquid crystal panel including a liquid crystal layer 102 encapsulated between a first substrate 104 and a second substrate 106, wherein a first optical film 110 is stacked on one side (upper side) of the first substrate 104 and a second optical film 120 is stacked on one side (lower side) of the second substrate 106.

As used herein, the terms "upper side" and "lower side" are named for convenience with reference to upper and lower sides of the drawings and do not necessarily refer to an upper part and a lower part.

In one embodiment, the first substrate 104 may be a color filter (CF) substrate (upper substrate) and the second substrate 106 may be a thin film transistor (TFT) substrate (lower substrate).

The first substrate 104 and the second substrate 106 may be glass substrates or plastic substrates. The plastic substrate is applicable to flexible displays and may be comprised of at least one polymer selected from the group consisting of polyethylene terephthalate (PET), polycarbonate (PC), polyimide (PI), polyethylene naphthalate (PEN), polyether sulfone (PES), polyarylate (PAR), and cycloolefin copolymers (COC), without being limited thereto.

The first optical film 110 of the present invention may include a first compensation layer 112 and a first polarizing layer 114. The first optical film 110 may further include a first protective layer 116, and the like. Namely, the first optical film 110 may be a polarizing plate including a polarizing layer (polarizer).

The first compensation layer 112 may be comprised of a polyimide (PI) copolymer. The polyimide copolymer may be a copolymer of a monomer mixture, which include a maleimide compound and an aromatic vinyl compound. For example, the monomer mixture may further include maleic anhydride. Preferably, the monomer mixture further includes maleic anhydride and a vinyl cyanide compound.

In other words, the copolymer of the first compensation layer 112 may include a repeat unit of Formula 1-1 derived from a maleimide compound (N-substituted maleimide):

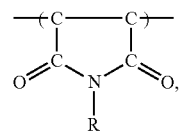

wherein R is hydrogen, a substituted or unsubstituted $C_1$-$C_6$ alkyl group, or a substituted or unsubstituted C6-C12 aryl group; and a repeat unit of Formula 1-2 derived from an aromatic vinyl compound:

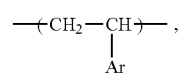

wherein Ar is a substituted or unsubstituted $C_6$-$C_{12}$ aryl group, and optionally include a repeat unit of Formula 1-3 derived from maleic anhydride:

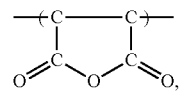

and a repeat unit of Formula 1-4 derived from a vinyl cyanide compound:

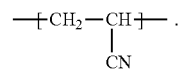

When the copolymer includes a repeat unit derived from the maleic anhydride, adherence to a water soluble polyvinyl alcohol (PVA) film constituting the first polarizing layer 114 may be improved.

In one embodiment, the polyimide copolymer may be a copolymer of a monomer mixture including a maleimide compound and an aromatic vinyl compound, and optionally, maleic anhydride and a vinyl cyanide compound. The copolymer may be prepared by copolymerizing the monomer mixture through radical polymerization and may be commercially obtainable. For instance, the copolymers may be prepared by introducing all the monomers to be used to prepare the copolymers into a polymerization reactor at the same time and then copolymerizing the resulting mixture.

In another embodiment, the polyimide copolymer may be prepared by copolymerizing a monomer mixture including a maleimide compound, an aromatic vinyl compound and optionally maleic anhydride, followed by blending the prepared copolymer with a copolymer of an aromatic vinyl compound and a vinyl cyanide compound.

In another embodiment, the polyimide copolymer may be prepared by copolymerizing a monomer mixture including a maleimide compound, an aromatic vinyl compound and optionally maleic anhydride, followed by blending the prepared copolymer with an aromatic vinyl polymer and a vinyl cyanide polymer.

Specific examples of the polyimide copolymer may include copolymers represented by Formula 1, without being limited thereto.

[Formula 1]

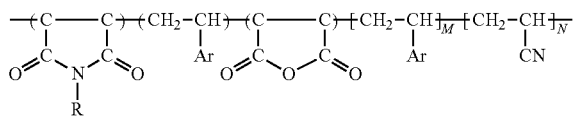

In the Formula 1, R is hydrogen, a substituted or unsubstituted $C_1$-$C_6$ alkyl group, or a substituted or unsubstituted $C_6$-$C_{12}$ aryl group; Ar is each independently a substituted or unsubstituted $C_6$-$C_{12}$ aryl group; and M and N are each independently an integer of 2 to 8.

The copolymer represented by Formula 1 refers to a polyimide copolymer prepared by copolymerizing a monomer mixture including a maleimide compound, an aromatic vinyl compound and maleic anhydride, followed by blending the prepared copolymer either with a copolymer of an aromatic vinyl compound and a vinyl cyanide compound, or with the aromatic vinyl polymer and the vinyl cyanide polymer, wherein the content of each repeat unit and the weight average molecular weight of the copolymer are almost the same as those of conventional copolymers, without being limited thereto, and wherein the content ratio between the aromatic vinyl compound to the vinyl cyanide compound ranges from about 2:8 to about 8:2.

The compensation layer (compensation film) comprised of the polyimide copolymer may be subjected to uniaxial elongation to provide a transverse optical axis. Namely, upon elongation, the slow axis can be controlled in the transverse direction by orientation of conjugated double bonds, which removes the necessity of separate TD elongation, thereby facilitating manufacture of the compensation layer while significantly lowering manufacturing cost.

The compensation layer (compensation film) can be divided into a uniaxial compensation layer and a biaxial compensation layer depending on the number of optical axes. Namely, when the compensation layer has a single optical axis, it is called a uniaxial compensation layer, and when the compensation layer has two optical axes, it is called a biaxial compensation layer. In addition, the compensation layer (compensation film) can be called a positive compensation layer and a negative compensation layer depending on difference between an index of refraction in an optical axis direction and an index of refraction in another direction. Namely, if the index of refraction in the optical axis direction is larger than the index of refraction in the other direction, it is called a positive compensation layer. If the index of refraction in the optical axis direction is smaller than the index of refraction in the other direction, it is called a negative compensation layer.

The compensation film used in liquid crystal displays has a phase retardation value and thus serves to offset or add phase retardation caused by liquid crystal cells. The sorts of the phase retardation value include two sorts, i.e. an in-plane phase retardation value ($R_e$) and a phase retardation value in a thickness direction ($R_{th}$), which are defined by Equation 1.

$$R_e = (n_x - n_y) \times d$$

$$R_{th} = (n_z - (n_x + n_y)/2) \times d$$

$$C_s = (n_x - n_y)/(n_z - n_y) \qquad \text{[Equation 1]}$$

Wherein, $n_x$, $n_y$, and $n_z$ represent the indexes of refraction in the x-axis, y-axis and z-axis (thickness) directions, respectively, d represents the thickness of films, and $C_s$ represents the ratio of indexes of refraction between the in-plane index of refraction axis and the vertical direction axis. Herein, the x-axis refers to a direction along which the in-plane index of refraction becomes a maximum value, the y-axis refers to a direction perpendicular to the x-axis, and the z-axis refers to the thickness direction.

The first compensation layer 112 may be a biaxial film including a polyimide copolymer, for example, a copolymer of polyimide and polystyrene, and specifically, a copolymer represented by Formula 1. More specifically, the first compensation layer may be a negative biaxial film, in which the indexes of refraction $n_x$, $n_y$ in the x and y directions on a plane and the index of refraction $n_z$ in the thickness direction satisfy a relationship:

$n_z > n_x > n_y$.

The first compensation layer 112 may have reversed wavelength dispersion characteristics. The reversed wavelength dispersion means that, as the wavelength in the range of visible light increases, the in-plane phase retardation value ($R_e$) increases. If the compensation layer has the reversed wavelength dispersion characteristics, it can compensate for positive wavelength dispersion of vertical alignment liquid crystals, thereby improving lateral contrast and color shift on a side surface.

The first compensation layer 112 may have $R_e$ in the range from about 40 to about 100 nm at 550 nm, preferably in the range from about 45 mm to about 95 nm. The first compensation layer 112 may have $R_{th}$ in the range from about 100 to about 150 nm at 550 nm, preferably in the range of about 105 mm to about 145 nm. Within this range, the lateral viewing angle can be remarkably improved and, in particular, the lateral contrast ratio of the vertical alignment mode liquid crystals can be significantly improved.

The compensation film formed of two conventional biaxial films has $C_s$ in the range from about −0.5 to about −0.3. In contrast, the first compensation layer 112 comprised of the polyimide copolymer has $C_s$ in the range from about −0.7 to about −0.2, which enables manufacture of a compensation layer (film) having $C_s$ values in a wider range.

The first compensation layer 112 may be formed in a film shape and stacked with the first polarizing layer 114. The first compensation layer may have a thickness in the range from about 5 μm to about 100 μm. The thickness of the compensation layer can be suitably adjusted depending on the kind of liquid crystal (physical properties), the thickness of the liquid crystal layer, and the like.

The first polarizing layer 114 may include a polarizer prepared by dyeing a polyvinyl alcohol (PVA) film with a dichromatic material such as iodine, followed by stretching the film. The polyvinyl alcohol film can be commercially available or prepared by solvent casting, melt extrusion, and the like. In solvent casting, a film may be prepared by dissolving a resin in a solvent to form a solution, coating the resultant solution onto a casting roll or a belt, and drying the coating. In melt extrusion, a film may be prepared by heating a resin to a melting temperature to melt the resin, extruding the melt in a cold roll, and cooling the melt.

The solution to prepare the film may further include a plasticizer to enhance flexibility of the polyvinyl alcohol film, and a surfactant to release the dried polyvinyl alcohol film from a belt or a drum. The polyvinyl alcohol film prepared as such or conventional polyvinyl alcohol film may be stretched to prepare a polarizer (polarizing layer). In detail, the polyvinyl alcohol may be subjected to washing/swelling, dyeing, crosslinking, stretching, and complementary color treatment.

The polarizer includes a long chain ring of hydrocarbons arranged in a row in the stretching direction of the polyvinyl alcohol film. The chain ring has conductivity owing to the iodine molecules dyed thereto. Since light having an electric field vector parallel to the chain ring can be absorbed, the stretching direction becomes a light absorption axis, while the axis perpendicular to the absorption axis is referred to as a transmission axis.

The first protective layer 116 may be comprised of, for example, acetates such as triacetylcellulose (TAC), polycarbonates, polyamides, polyimides, polyolefins, polyesters, polyethersulfone, and polypropylene (PP) films. Preferably, a TAC film is used.

Further, a pressure sensitive adhesive may be formed under the first compensation layer 112, namely, between the first substrate 104 and the first compensation layer 112. A surface treatment layer (not shown) may be formed on one side (upper side) of the first protective layer 116. The surface treating layer may be an antiglare layer (AG) or an anti-reflection coating (ARC) layer.

The second optical film 120 of the present invention may include a second compensation layer 122 and a second polarizing layer 124. In addition, the second optical film 120 may include a second protective layer 126. The second polarizing layer 124 is the same as the first polarizing layer 114 and may be a polarizer (polarizing layer) manufactured by the same method, provided that the second polarizing layer 124 and the first polarizing layer 114 may be cut in the cutting process such that the optical axes (absorption axis) of the polarizers are perpendicular (90°) to each other.

The second compensation layer 122 may be a biaxial film or a C-plate. The biaxial film may be a positive biaxial film in which the index of refraction in the x and y directions ($n_x$, $n_y$) on a plane and the index of refraction in the thickness direction ($n_z$) satisfy the relationship $n_x > n_y > n_z$. Preferably, the second compensation layer is a cycloolefin polymer (COP) film, triacetylcellulose (TAC) film, or a polyether sulfone (PES) film.

The C-plate may be a positive C-plate in which the refractive indices $n_x$ and $n_y$ in the x and y direction on a plane and the index of refraction $n_z$ in a thickness direction satisfy the relationships $n_x = n_y < n_z$ and $R_{th} > 0$. The C-plate may be made of homeotropic liquid crystals and may be a COP or an acrylic C-plate.

The liquid crystal layer 102 may be a liquid crystal layer including vertical alignment (VA) mode liquid crystals. Examples of the vertical alignment mode include multi-domain vertical alignment mode in which a ridge including electrode pairs on the first substrate and second substrate is formed on a surface adjacent the liquid crystal layer to form a multi-domain, patterned vertical alignment mode in which a multi-domain structure is formed by applying voltage to patterned electrodes, vertical alignment mode using chiral additives and the like, wherein the cell gap of the liquid crystal cell may be about 2 to about 8 μm.

Figure 2:
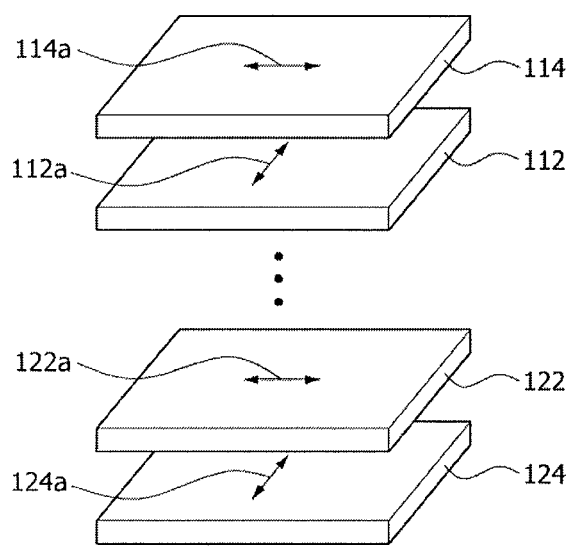
FIG. 2 is a conceptual view explaining an optical axis of a liquid crystal display according to one embodiment of the present invention.

FIG. 2 is a conceptual view explaining an optical axis of the liquid crystal display according to one embodiment of the present invention. As shown in FIG. 2, the slow axis 112a of the first compensation layer 112 may be perpendicular to the absorption axis 114a of the first polarizing layer; the slow axis 112a of the first compensation layer may be perpendicular to the slow axis 122a of the second compensation layer 122; and the slow axis 122a of the second compensation layer 122 may be perpendicular to the absorption axis 124a of the second polarizing layer 124. When arranged as mentioned above, the two phase retardation films exhibit excellent wavelength dispersion characteristics such as a good index of refraction, thereby significantly improving viewing angle characteristics. Particularly, the lateral viewing angle (contrast ratio) is remarkably improved.

The term "perpendicular" as used in description of the optical axis arrangement means that it includes the case where the optical axis is arranged substantially perpendicular to another axis. For example, the absorption axis 114a of the first polarizing layer 114 is perpendicular to the absorption axis 124a of the second polarizing layer 124, wherein the perpendicular degree includes about 90°±about 2.0°, preferably about 90°±about 1.0°, more preferably about 90°±about 0.5°.

The liquid crystal display has a slow axis and a rapid axis perpendicular to a traveling direction of light and these two axes are perpendicular to each other. The first compensation layer 112 and the second compensation layer 122 serve to change phase velocity of incident light such that the velocity of polarized light traveling along the slow axis becomes slower.

Mode for Invention

Next, the present invention will be explained in more detail with reference to some examples. These examples are provided for illustration only and are not to be construed in any way as limiting the present invention.

EXAMPLE

Examples 1~7

A color filter substrate was used as an upper substrate, that is, a first substrate. As a first compensation layer, a PI compensation film was attached to the first substrate. A first polarizing layer and a first protective layer were stacked in this order to one side of the first compensation layer. A TFT substrate was used as a lower substrate, that is, a second substrate. As a second compensation layer, a biaxial or C-plate compensation film was attached to one side of the second substrate. In addition, a second polarizing layer and a second protective layer were stacked in this order to one side of the second compensation layer, thereby manufacturing a vertical alignment mode liquid crystal display. The first compensation layer and the second compensation layer are as listed in Table 1.

Comparative Examples 1~4

The vertical alignment mode liquid crystal display was manufactured in the same manner as in Example 1 except that the first compensation layer and the second compensation layer were changed as listed in Table 1.

TABLE 1

|  | Upper substrate (CF surface) | | Lower substrate (TFT surface) | |
|---|---|---|---|---|
|  | Cs | Compensation film | Cs | Compensation film |
| Example 1 | −0.23 | PI | −0.5 | Biaxial |
| Example 2 | −0.58 | PI | −0.01 | C-plate |
| Example 3 | −0.23 | PI | −0.3 | Biaxial |
| Example 4 | −0.58 | PI | −0.5 | Biaxial |
| Example 5 | −0.58 | PI | −0.3 | Biaxial |
| Example 6 | −0.58 | PI | −0.05 | C-plate |
| Example 7 | −0.23 | PI | −0.05 | C-plate |
| Comparative Example 1 | −0.5 | Biaxial | −0.5 | Biaxial |
| Comparative Example 2 | −0.3 | Biaxial | −0.3 | Biaxial |
| Comparative Example 3 | −3.2 | A-plate | −0.01 | C-plate |
| Comparative Example 4 | −3.2 | A-plate | −0.05 | C-plate |

*PI compensation film: The PI compensation film includes a copolymer represented by Formula 1, and has indexes of refraction $n_x$ and $n_y$ in the x and y directions on a plane and an index of refraction $n_z$ in the thickness direction satisfying the relationships $n_z > n_x > n_y$, $R_e$ of 40 nm to 100 nm, and $R_{th}$ of 100 nm to 150 nm. The PI compensation film used in Examples 1, 3 and 7 were compensation films satisfying $R_e/R_{th}$=50/135 nm at 550 nm. The PI compensation film used in Examples 2, 4 to 6 were compensation films satisfying $R_e/R_{th}$ = 40/125 nm at 550 nm.
*Biaxial compensation film: The biaxial film (Zeon Inc.) having indexes of refraction $n_x$ and $n_y$ in the x and y directions on a plane and an index of refraction $n_z$ in a thickness direction satisfying a relationship: $n_x > n_y > n_z$, $R_e > 0$, and $R_{th} < 0$ was used.
*C-plate compensation film: The compensation film (JSR Inc.) having indexes of refraction $n_x$, $n_y$ in the x and y directions on a plane and an index of refraction ($n_z$) in the thickness direction satisfying a relationship: $n_x = n_y < n_z$, and $R_{th} > 0$ was used.
*A-plate compensation film: The compensation film (JSR Inc.) having indexes of refraction $n_x$, $n_y$ in the x and y directions on a plane and an index of refraction $n_z$ in the thickness direction satisfying a relationship: $n_x > n_y = n_z$, and $R_e > 0$ was used.

Evaluation of Optical Properties

The compensation films of Examples 1~7 and Comparative Examples 1~4 shown in Table 1 were attached to vertical alignment mode liquid crystal panels and evaluated as to their optical properties. White and black brightness were measured using an SR3 apparatus. In addition, the lateral contrast ratio was calculated from white/black brightness at an azimuth angle (Φ) of 45° and a polar angle (θ) of 60°. Results are summarized in Table 2.

Figure 3:
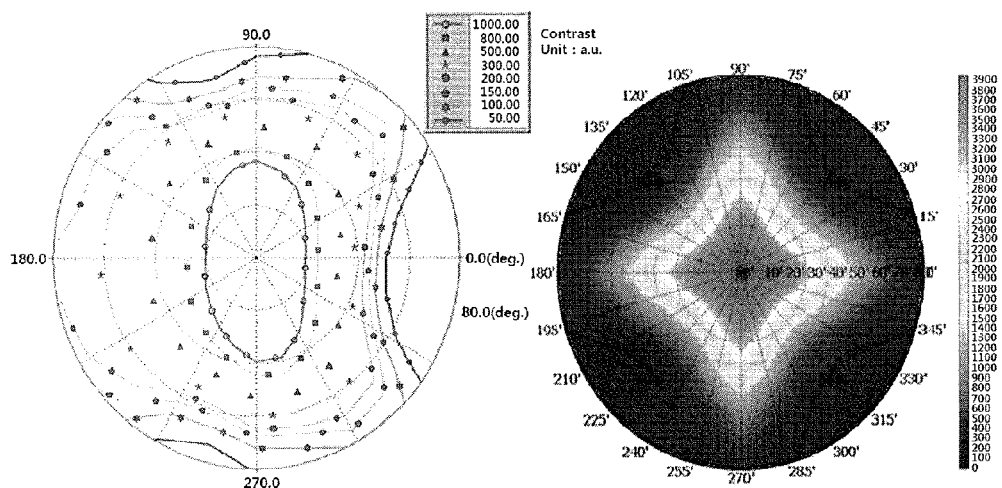
FIGS. 3 and 4 show simulation results of contrast ratio at every longitude angle of vertical alignment mode liquid crystal display of Examples 1 and 2 simulated using white light.
Figure 4:
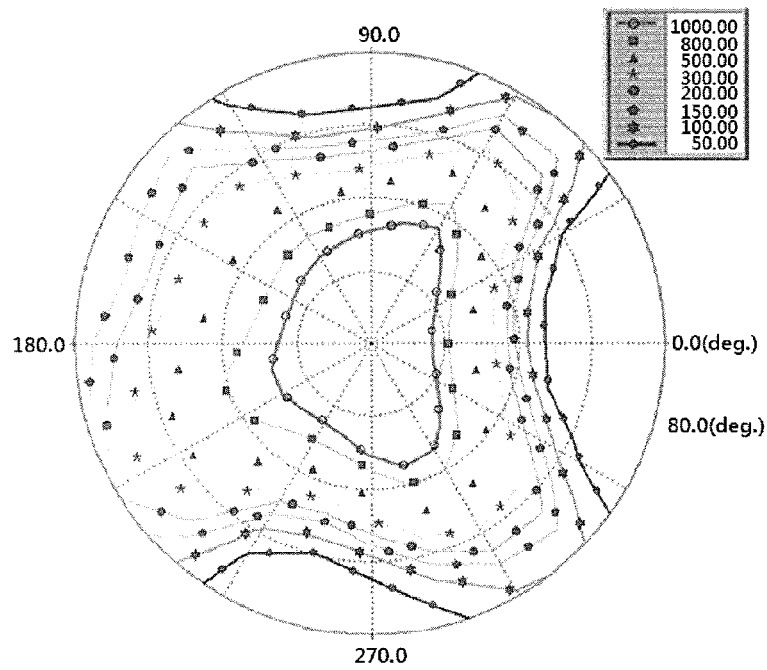

FIGS. 3 and 4 show simulation results of contrast ratio at every coterminal angle of vertical alignment mode liquid crystal displays of Examples 1 and 2 simulated using white light.

TABLE 2

|  | White Brightness (unit: cd) | Black Brightness (unit: cd) | Lateral contrast ratio |
|---|---|---|---|
| Example 1 | 58 | 0.38 | 153 |
| Example 2 | 58 | 0.41 | 141 |
| Example 3 | 57 | 0.42 | 136 |

TABLE 2-continued

|  | White Brightness (unit: cd) | Black Brightness (unit: cd) | Lateral contrast ratio |
|---|---|---|---|
| Example 4 | 58 | 0.43 | 135 |
| Example 5 | 53 | 0.40 | 133 |
| Example 6 | 56 | 0.43 | 131 |
| Example 7 | 51 | 0.38 | 134 |
| Comparative Example 1 | 57 | 0.71 | 80 |
| Comparative Example 2 | 54 | 0.70 | 77 |
| Comparative Example 3 | 57 | 0.52 | 110 |
| Comparative Example 4 | 51 | 0.50 | 102 |

As apparent from Table 2, it can be seen that the average lateral contrast ratio of the liquid crystal displays in Examples 1 to 7 was 137.4 and the average lateral contrast ratio of the liquid crystal displays in Comparative Examples 1 to 4 was 92.3, that is, average lateral contrast ratio of the liquid crystal displays of Examples 1 to 7 was about 49% higher than that of the liquid crystal displays in Comparative Examples 1 to 4.

Although some embodiments have been disclosed herein, it should be understood by those skilled in the art that these embodiments are provided by way of illustration only, and that various modifications, changes, and alterations can be made without departing from the spirit and scope of the present invention. Therefore, the scope of the present invention should be limited only by the accompanying claims and equivalents thereof.

The invention claimed is:

1. A liquid crystal display, comprising:
a liquid crystal panel including vertical alignment liquid crystals encapsulated between a first substrate and a second substrate;
a first compensation layer stacked on one side of the first substrate;
a first polarizing layer stacked on one side of the first compensation layer;
a second compensation layer stacked on one side of the second substrate; and
a second polarizing layer stacked on one side of the second compensation layer,
wherein the first compensation layer includes a polyimide copolymer, the polyimide copolymer being a copolymer of:
a first copolymer including repeating units of a maleimide compound and an aromatic vinyl compound, and
a second copolymer including repeating units of an aromatic vinyl compound and a vinyl cyanide compound.

2. The liquid crystal display according to claim 1, wherein the first copolymer further includes repeating units of maleic anhydride.

3. The liquid crystal display according to claim 2, wherein the polyimide copolymer includes a unit represented by Formula 1-1, a unit represented by Formula 1-2, a unit represented by Formula 1-3, and a unit represented by Formula 1-4:

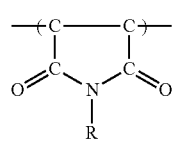

[Formula 1-1]

-continued

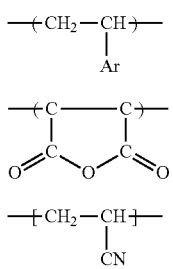

[Formula 1-2]

[Formula 1-3]

[Formula 1-4]

in the Formula 1-1, each R is independently hydrogen, a substituted or unsubstituted $C_1$-$C_6$ alkyl group, or a substituted or unsubstituted $C_6$-$C_{12}$ aryl group; and in the Formula 1-2, each Ar is independently a substituted or unsubstituted $C_6$-$C_{12}$ aryl group.

4. The liquid crystal display according to claim 2, wherein the polyimide copolymer is represented by Formula 1:

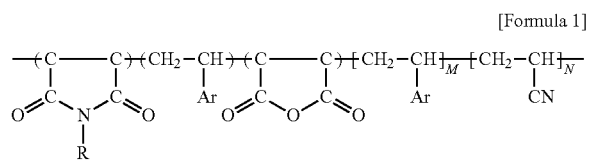

[Formula 1]

in the Formula 1, each R is independently, a substituted or unsubstituted $C_1$-$C_6$ alkyl group, or a substituted or unsubstituted $C_6$-$C_{12}$ aryl group; each Ar is independently a substituted or unsubstituted $C_6$-$C_{12}$ aryl group; and M and N are each independently an integer from 2 to 8.

5. The liquid crystal display according to claim 1, wherein the first compensation layer has reversed wavelength dispersion characteristics.

6. The liquid crystal display according to claim 1, wherein the first compensation layer has $C_s$ of about −0.7 to about −0.2.

7. The liquid crystal display according to claim 1, wherein $R_e$ of the first compensation layer ranges from about 40 nm to about 100 nm at 550 nm.

8. The liquid crystal display according to claim 1, wherein $R_{th}$ of the first compensation layer ranges from about 100 nm to about 150 nm at 550 nm.

9. The liquid crystal display according to claim 1, wherein the second compensation layer is a biaxial film or a C-plate.

10. The liquid crystal display according to claim 9, wherein the biaxial film has indexes of refraction ($n_x$, $n_y$) in x and y directions on a plane and an index of refraction ($n_z$) in a thickness direction satisfying a relationship: $n_x > n_y > n_z$, $R_e$ of greater than 0 ($R_e > 0$), and $R_{th}$ of less than 0 ($R_{th} < 0$).

11. The liquid crystal display according to claim 9, wherein the biaxial film is a cycloolefin polymer (COP), triacetylcellulose (TAC), or polyether sulfone (PES) compensation film.

12. The liquid crystal display according to claim 9, wherein the C-plate is a cycloolefin polymer (COP) or acrylic compensation film having indexes of refraction ($n_x$, $n_y$) in x and y directions on a plane and an index of refraction ($n_z$) in a thickness direction satisfying a relationship: $n_x = n_y < n_z$, and $R_{th}$ of greater than 0 ($R_{th} > 0$).

13. The liquid crystal display according to claim 1, wherein the first compensation layer has a slow axis perpendicular to a slow axis of the second compensation layer, the slow axis of the first compensation layer being perpendicular to an absorption axis of the first polarizing layer, the slow axis of the second compensation layer being perpendicular to the absorption axis of the second polarizing layer.

14. A compensation film comprising a copolymer of:
a first copolymer of a maleimide compound, an aromatic vinyl compound, and maleic anhydride, and
a second copolymer of a vinyl cyanide compound and an aromatic vinyl compound.

15. The compensation film according to claim 14, wherein the compensation film has $C_s$ of −0.7 to −0.2, $R_e$ of about 40 nm to about 100 nm at 550 nm, and $R_{th}$ of about 100 nm to about 150 nm at 550 nm.

16. A liquid crystal display, comprising:
a liquid crystal panel that includes vertical alignment liquid crystals encapsulated between a first substrate and a second substrate;
a first compensation layer stacked on one side of the first substrate;
a first polarizing layer stacked on one side of the first compensation layer;
a second compensation layer stacked on one side of the second substrate; and
a second polarizing layer stacked on one side of the second compensation layer,
wherein the first compensation layer includes a polyimide copolymer represented by Formula 1:

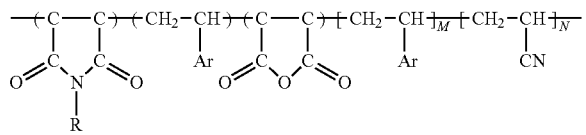

[Formula 1]

wherein, in Formula 1,
each R is independently a substituted or unsubstituted $C_1$-$C_6$ alkyl group or a substituted or unsubstituted $C_6$-$C_{12}$ aryl group;
each Ar is independently a substituted or unsubstituted $C_6$-$C_{12}$ aryl group; and
M and N are each independently an integer from 2 to 8.

* * * * *